UNITED STATES PATENT OFFICE.

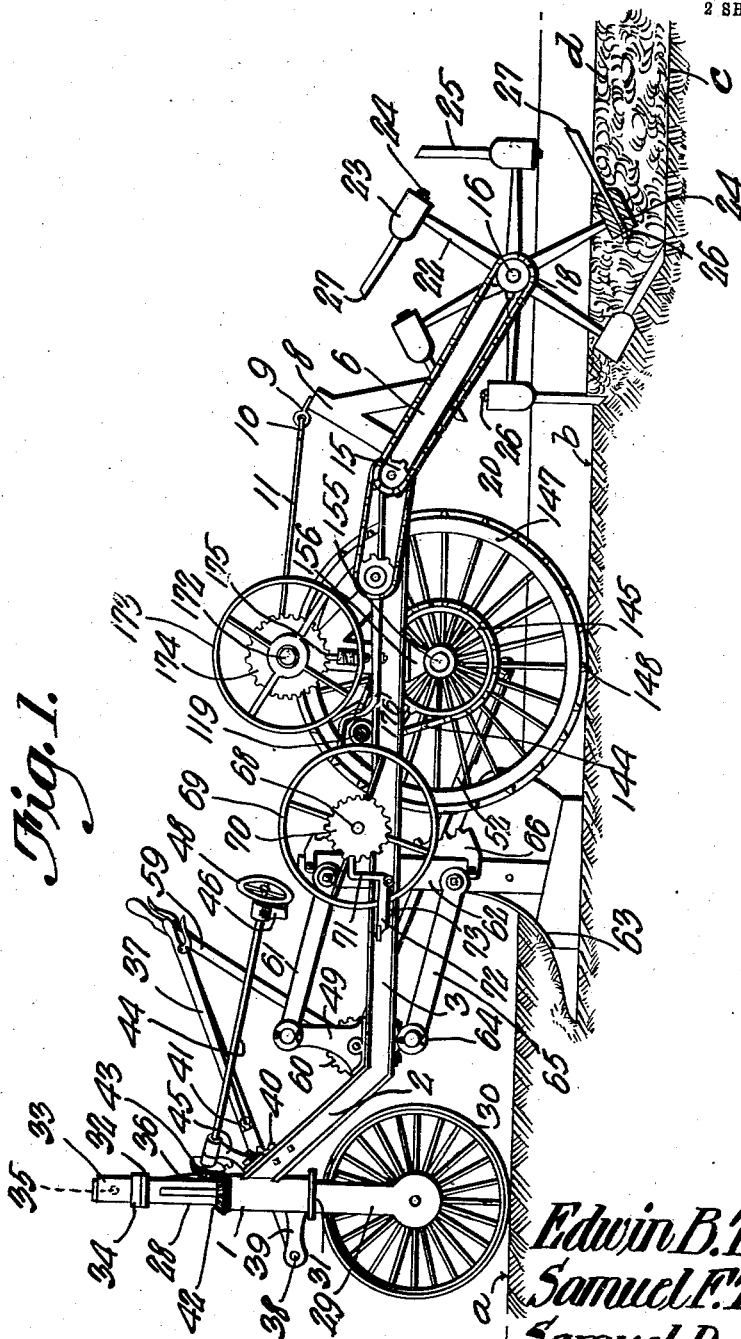

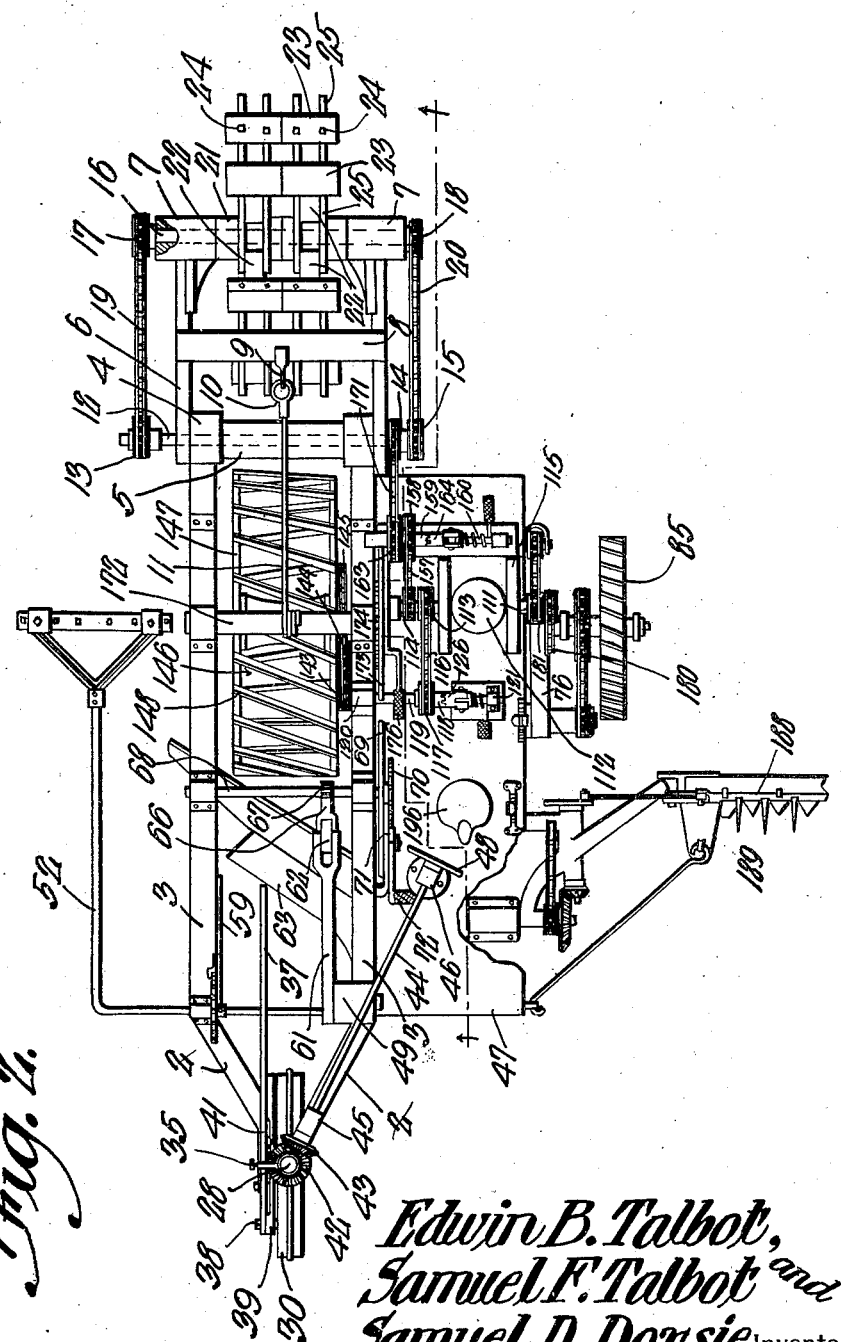

EDWIN B. TALBOT, SAMUEL F. TALBOT, AND SAMUEL D. DOXSIE, OF EDMOND, OKLAHOMA.

AGRICULTURAL MACHINE.

1,085,508.  Specification of Letters Patent.  Patented Jan. 27, 1914.

Application filed April 30, 1912. Serial No. 694,112.

*To all whom it may concern:*

Be it known that we, EDWIN B. TALBOT, SAMUEL F. TALBOT, and SAMUEL D. DOXSIE, citizens of the United States, residing at Edmond, in the county of Oklahoma, State of Oklahoma, have invented a new and useful Agricultural Machine, of which the following is a specification.

This invention relates to agricultural machines and more particularly to a self-propelled plow having means combined therewith for loosening and pulverizing the subsoil whereby to aerate and otherwise prepare the sub-soil to allow for proper drainage, permit the delivery of water to the seeds or roots by capillary attraction from the lowest or undisturbed stratum of earth, and otherwise accelerate the growth of vegetation.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine with the platform and certain of the parts thereon removed, the land wheel being also removed. Fig. 2 is a plan view of the machine.

Referring to the figures by characters of reference 1 designates a tubular steering head having downwardly inclined rearwardly diverging frame members 2 bolted or otherwise secured thereto, said frame members merging into rearwardly extending parallel side frame members 3 provided, at their rear ends, with cylindrical bearings 4 in which a tubular cross member 5 is mounted to rotate. This tubular cross member has parallel side arms 6 integral therewith or secured thereto and provided, at their rear ends, with tubular bearings 7 which can be formed on or secured to the side members. An arch 8 may be bolted or otherwise attached to the side members 6 or, if preferred, can be formed integral therewith. This arch has a central loop 9 or other device extending therefrom and adapted to be engaged by a ring 10 or the like having a cable chain or other flexible member 11 extending therefrom.

A shaft 12 is journaled within the tubular member 5 and projects beyond the ends thereof, said shaft being provided at one end with a sprocket 13 and at its other end with two sprockets 14 and 15 which rotate with the shaft. Another shaft 16 is journaled within the bearings 7 and is provided at one end with a sprocket 17 and at its other end with a sprocket 18, the sprocket 17 being engaged by a chain 19 which is also mounted on the sprocket 13. Sprocket 18 is engaged by a chain 20 which engages the sprocket 15.
Mounted on and rotating with the shaft 16 and between the bearings 7 are hubs 21 each of which has radial spokes 22. Each spoke carries, at its outer end, a transversely extending head 23 having openings therein for the reception of the reduced ends 24 of pulverizing fingers 25, these fingers being preferably at right angles to the spokes to which they are connected and being attached to the heads 23 by nuts or the like such as indicated at 26 and which engage the screw threaded ends of the fingers. All of the fingers 25 are arranged in the same relation to their heads 23 and have their free or advancing ends pointed, as shown at 27.

It is to be understood that any desired number of hubs 21 can be used and it is designed to have the heads 23 of the different sections of the sub-soiling attachment arranged in alinement, as shown particularly in Fig. 2.

Mounted for rotation within the steering head 1 is a spindle 28 provided, at its lower end, with a fork 29 in which a steering wheel 30 is mounted. The head of the fork has been indicated at 31 and constitutes a bearing for the steering head 1. A collar 32 is formed on the spindle 28 near its upper end and serves to support a sleeve 33 which is loosely mounted on the upper end portion of the spindle and has its lower end enlarged, as at 34, so as to present a broad bearing surface to the collar 32.

A stud 35 extends radially from the sleeve 33 and is pivotally engaged by a link 36 extending downwardly and pivotally connected to a lever 37. This lever is fulcrumed, as at 38, upon an arm 39 extending from and movable with the head 1. A toothed segment 40 is formed on or secured to the steering head 1 and is adapted to be engaged by a spring pressed dog 41 such as commonly employed and which is mounted on the lever 37, this dog serving to lock the lever in any position to which it may be shifted about its pivot 38.

It will be apparent that by providing the lever 37 and the parts connected thereto, the steering head 1 can be shifted longitudinally along the spindle 28, thus to raise or lower the front end of the frame. Obviously by pulling downwardly on the handle end of the lever 37, link 36 will pull on stud 35 and sleeve 33 and said sleeve will push downwardly on collar 32. The lower end of link 36 thus becomes the fulcrum of the lever and the arm 39 and the head 1 will thus be elevated along the spindle 28.

A gear 42 is feathered on the spindle 28 and bears on the steering head 1. This gear meshes with a gear 43 which is fastened to one end of a shaft 44. Said shaft is journaled adjacent its front end in a standard 45 projecting upwardly from the front ends of the inclined portions 2 of the frame of the machine. The rear end portion of the shaft 44 is journaled within a standard 46 mounted on a platform 47 which extends laterally from and suitably secured to one of the side members 3 of the frame. A hand wheel 48 is attached to the rear end of the shaft 44 and by means thereof said shaft can be readily rotated so as to transmit motion through the gears 42 and 43 to the spindle 28. As the gear 42 is feathered on the spindle 28 it will be seen that said spindle can be rotated in this manner irrespective of the longitudinal adjustment of the spindle by means of lever 37.

If desired a harrow 52 may be arranged at one side of the structure, this harrow being raised and lowered by means of a lever 59.

The bearing 49 is in the form of a standard, as will be seen readily by referring to Fig. 1 of the drawings. An arm 61 is pivotally connected to the upper end of this bearing 49 and is also pivotally connected to the upper end of a plow standard 62 which, as shown in Fig. 1, extends upwardly from a plow 63 of the ordinary type. Another bearing 64 is secured to the frame of the machine at a point under the bearing 49 and has an arm 65 pivotally connected to it and to the standard 62. Standard 62 is parallel with the plane of the axes of rotation of arms 61 and 65 and the said arms 61 and 65 are parallel with each other. Thus it will be seen that a parallelogram is formed and the standard 62 is maintained vertical at all times during its adjustment.

An arcuate rack 66 is secured to the standard 62 and meshes with a gear 67 which is secured to and rotates with a shaft 68 journaled on the side members 3 of the frame. A hand wheel 69 is secured to this shaft 68 and is utilized for the purpose of rotating the shaft. A gear 70 is also secured to the shaft 68 close to the wheel 69 and is adapted to be engaged by a dog 71 extending from a foot lever 72 which is mounted on the platform 47. A spring 73 serves to hold the foot lever 72 normally elevated and the dog 71 normally in engagement with the gear 70.

From the foregoing it will be apparent that, while the dog 71 is in engagement with the gear 70, the shaft 68 cannot rotate and the plow 63 will thus be secured at a desired distance below the frame members 3. When it is desired to raise or lower the plow, however, with reference to the frame of the machine, the foot lever 72 is depressed so as to withdraw the dog 71 from engagement with gear 70. Shaft 68 can then be rotated by means of the hand wheel 69 and when the plow 63 has been brought to the position desired, the foot lever 72 can be released. Spring 73 will promptly return the foot lever and the dog to their initial positions, thus locking the gear 70 and the shaft 68 against further movement.

An arm 76 is adjustable angularly at one side of the machine and carries the land wheel 85 which may be driven by any suitable mechanism. A motor 112 is mounted on the platform 47 and has a drive shaft 111 provided with sprockets 113 and 114 and also carries one or more fly wheels 115 which, if desired, can be used for driving belts where the motor is employed for actuating machinery other than that carried by the structure herein described. Sprocket 113 transmits motion, through a chain 116 to another sprocket 117 the hub 118 of which is loosely mounted on a shaft 119 journaled in bearings 120 and 121. This sprocket has a suitable clutch 126 for coupling it to the shaft.

Secured to the shaft 119 close to the inner face of the adjacent side member 3 is a sprocket 143 adapted to transmit motion, through a chain 144, to another sprocket 145 secured to the hub of the main propelling or furrow wheel 146. This wheel preferably includes spaced similar rims 147 connected by diagonally disposed cleats 148 which can be formed integral therewith or can be secured thereto. The wheel 146 is adapted to rotate on a shaft 155 mounted within hangers 156 secured to and extending downwardly from the side members 3 of the frame.

It will be apparent from the foregoing description that whenever the clutch 126 is shifted into engagement with the hub 118, sprocket 117 will be coupled to the shaft 119 and motion will therefore be transmitted from the motor 112 to the main drive wheel 146.

The sprocket 114 heretofore referred to transmits motion through a chain 157 to a sprocket 158 which has a hub 159 loosely mounted on a shaft 160 and provided with a suitable clutch 164 for coupling it to the shaft 160. A chain 171 serves to transmit motion from the sprocket 163 to sprocket 14.

From the foregoing it will be apparent that while the motor is in operation and the clutch 164 is out of engagement with hub 159, sprocket 158 can be caused to rotate freely on the shaft 160. When, however, clutch 164 is shifted into engagement with the hub 159, the sprocket 158 will be coupled to the shaft 160 and motion will thus be transmitted to the shaft 12 and through the chains 19 and 20 and the various sprockets 13, 15, 17 and 18, to shaft 16 and the sub-soiling devices mounted on said shaft.

The flexible element 11 is secured at one end to a shaft 172 journaled on the side members 3 of the frame and a hand wheel 173 is secured to one end of this shaft. A gear 174 is also secured to the shaft 172 and is normally engaged by a spring pressed plunger 175. This plunger is connected in any desired manner to a foot lever 176 which, when depressed, serves to retract the plunger out of engagement with gear 174 so as thus to permit the shaft 172 to be rotated readily by means of the wheel 173.

It may be thought that the operation of the machine will be apparent from the foregoing description. When the machine is to be propelled forwardly the wheel 85 is adjusted vertically to the elevation necessary to hold the frame of the machine substantially horizontal and the spindle 28 is likewise adjusted vertically so as to support the machine horizontally from front to rear. During the forward movement of the machine the plow 63 opens a furrow and wheel 146 follows within this furrow. Motion will be transmitted from the motor to the rear shaft 16 and the hubs 21 will thus be rotated and the fingers 25 caused to dig into the sub-soil and to pulverize it. In Fig. 1 the field level has been indicated at $a$ and the bottom of the furrow produced by the plow 63 has been indicated at $b$. In the same figure the bottom of the sub-soil stratum has been indicated at $c$ while the top of the sub-soil stratum has been indicated at $d$. Thus it will be seen that the soil constituting the bottom of the furrow will be loosened and pulverized by the fingers 25 and as the plow travels in the next adjoining furrow it will throw the top soil over into the furrow previously formed and onto the stratum of aerated sub-soil.

If desired, and as shown in Fig. 2, the machine may be provided with a mowing attachment 188.

It is to be understood that a seat for the operator can be located at any suitable point on the platform 47, such a seat being shown at 196 in Fig. 2. Furthermore a suitable canopy can be erected over the platform so as to protect the operator from the heat of the sun.

What is claimed is:—

1. In a machine of the class described, a steering wheel, a furrow wheel, a land wheel, a structure supported by said wheels, a plow supported in front of the furrow wheel, and a revoluble sub-soiling element supported in rear of the furrow wheel.

2. In a machine of the class described, a steering wheel, a furrow wheel, a land wheel, a structure supported by said wheels, a plow supported in front of the furrow wheel, a revoluble sub-soiling element supported in rear of the furrow wheel, and means under the control of the operator for shifting the sub-soiling element upwardly or downwardly to vary the depth of the sub-soil stratum.

3. In a machine of the class described, a frame, a furrow wheel constituting one of the supports therefor, a motor, means operated by the motor for driving the furrow wheel, a land wheel constituting one of the supports for the frame, means operated by the motor for driving the land wheel, a structure connected to the frame and adapted to swing upwardly or downwardly, means under the control of the operator for swinging said structure relative to the frame, a revoluble series of soil engaging elements carried by said structure for aerating the sub-soil of a furrow, mechanism operated by the motor for rotating said series, and a furrow opener carried by the frame and in advance of the furrow wheel.

4. A machine of the class described including a frame, a furrow wheel constituting one of the supports therefor, a plow supported by the frame in front of the furrow wheel, a structure mounted to swing relative to the frame, a shaft journaled in said structure, spokes connected to and radiating from the shaft, a head upon each spoke, sub-soil engaging fingers carried by each head, a motor, and separate means operated by the motor for actuating the furrow wheel and the shaft respectively.

5. A machine of the class described including a frame, a furrow wheel constituting one of the supports therefor, a plow supported by the frame in front of the furrow wheel, a structure mounted to swing relative to the frame, a shaft journaled in said structure, spokes connected to and radiating from the shaft, a head upon each spoke, sub-soil engaging fingers carried by each head, a motor, separate means operated by the motor for actuating the furrow wheel and the shaft respectively, a winding element, a flexible connection between said element and the structure, means under the control of the operator for actuating the winding element, and means for holding said element against movement.

6. In a machine of the class described the combination with a frame and a furrow wheel constituting a support therefor, of a furrow opener carried by the frame and in advance of the wheel, a revoluble series of sub-soil engaging elements supported by the frame and back of the wheel, means for adjusting the furrow opener upwardly and downwardly relative to the frame, and means for adjusting the sub-soil engaging devices upwardly and downwardly relative to the frame.

7. In a machine of the class described the combination with a frame and a furrow wheel constituting a support therefor, of a furrow opener carried by the frame and in advance of the wheel, a revoluble series of sub-soil engaging elements supported by the frame and back of the wheel, means for adjusting the furrow opener upwardly and downwardly relative to the frame, means for adjusting the sub-soil engaging devices upwardly and downwardly relative to the frame, a motor, and separate means actuated by the motor for driving the furrow wheel and the sub-soil engaging devices separately or in unison.

In testimony that we claim the foregoing as our own, we have hereto affixed our signatures in the presence of two witnesses.

EDWIN B. TALBOT.
SAMUEL F. TALBOT.
SAMUEL D. DOXSIE.

Witnesses:
W. S. PATTEN,
C. H. PROFFITT.